United States Patent [19]
Mihailovic

[11] Patent Number: 5,937,490
[45] Date of Patent: Aug. 17, 1999

[54] SAFETY SNAP HOOK

[75] Inventor: Pierre Mihailovic, Manson, France

[73] Assignee: Wichard, Thiers, France

[21] Appl. No.: 09/029,842

[22] PCT Filed: Sep. 19, 1996

[86] PCT No.: PCT/FR96/01461

§ 371 Date: Apr. 20, 1998

§ 102(e) Date: Apr. 20, 1998

[87] PCT Pub. No.: WO97/11281

PCT Pub. Date: Mar. 27, 1997

[30] Foreign Application Priority Data

Sep. 22, 1995 [FR] France .................................. 95 11345

[51] Int. Cl.$^6$ .................................................. F16B 45/00
[52] U.S. Cl. ........................ 24/600.1; 24/599.4; 24/599.9
[58] Field of Search ............................... 24/600.1, 599.9, 24/598.2, 599.5, 601.5, 601.3, 605, 599.4, 68 CD

[56] References Cited

U.S. PATENT DOCUMENTS

| | | | |
|---|---|---|---|
| 1,071,650 | 8/1913 | O'Kelly | 24/600.1 |
| 1,363,873 | 12/1920 | Hokanson | 24/600.1 |
| 1,402,868 | 1/1922 | King | 24/599.9 |
| 3,317,972 | 5/1967 | Harley | 24/599.4 |
| 5,579,564 | 12/1996 | Rullo et al. | 24/600.1 |

FOREIGN PATENT DOCUMENTS

| | | | |
|---|---|---|---|
| A1 31-26066 | 1/1983 | Germany. | |
| 0050291 | 11/1921 | Sweden | 24/599.4 |

*Primary Examiner*—Victor N. Sakran
*Attorney, Agent, or Firm*—Oliff & Berridge, PLC

[57] ABSTRACT

A safety snap hook comprising a so-called "hairpin" pawl including a rod of elastically deformable material, bent to form an open loop. Bent-over ends of the rod, about which the pawl pivots with respect to the body of the snap hook, are not coaxial. The snap hook being characterized in that the pawl is shaped in such a way that its bent-over ends are normally kept in spaced-apart position in which they are situated some distance from one another preventing pivoting with respect to the body. The pawl may be deformed in such a way as to bring the bent-over ends into a position in which they are closer together, in order to make pivoting possible. The body of the snap hook comprises an aperture in which one of the bent-over ends is engaged and can slide, while the other bent-over end is mounted so that it can pivot on the body about a fixed axis. The aperture is shaped to allow the bent-over end engaged in it to slide between a position in which the two bent-over ends of the pawl are spaced apart and a position in which the ends are closer together.

9 Claims, 2 Drawing Sheets

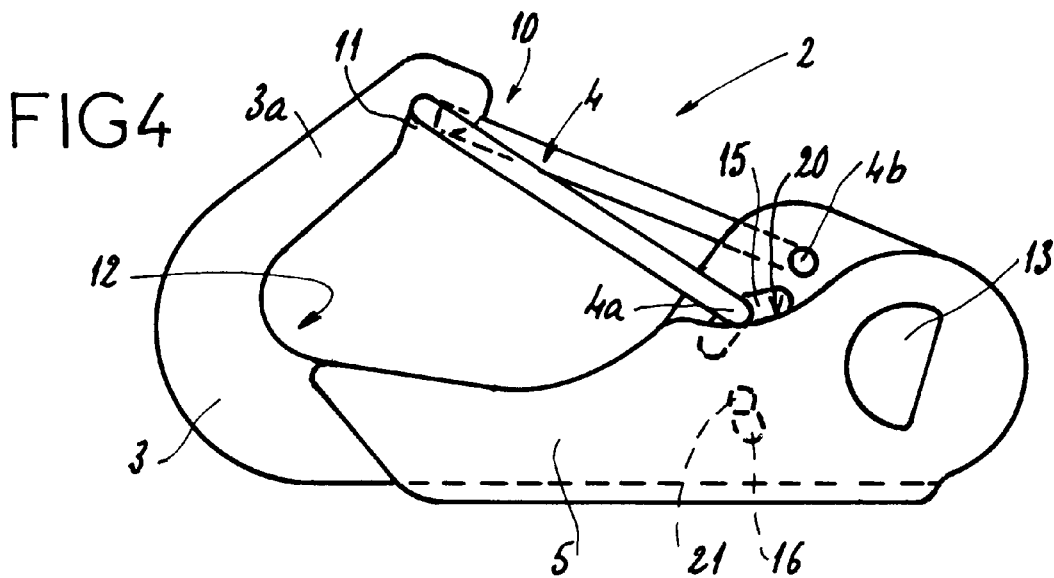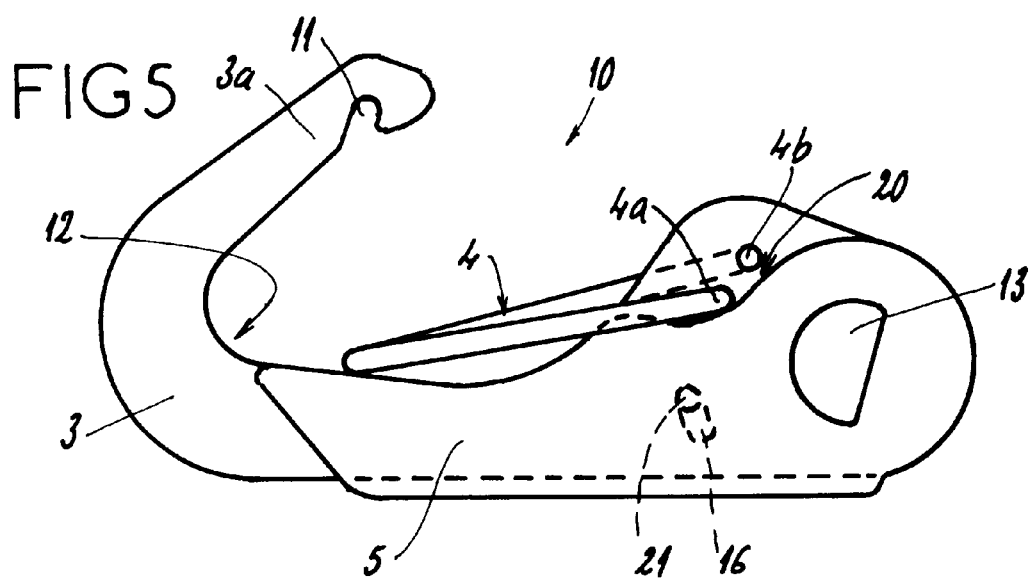

SAFETY SNAP HOOK

The present invention relates to a so-called "dual-action" safety snap hook, that is to say one that requires two different actions in order to open it.

This snap hook can be used in any field of activity, and in particular in the field of sailing, for example for securing a safety harness worn by the helmsman to a cable fixed to the deck of the boat, known as "lifeline".

A snap hook comprises a hollowed-out body, in the overall shape of a hook, the lateral opening of which is closed by a pawl. This pawl is mounted so that it can pivot on the body and can pivot between a position in which the snap hook is closed, in which position the free end of the pawl engages with the corresponding branch of the body, and a position in which the snap hook is open, in which position the pawl is pivoted towards the inside of the body.

To produce the pawl in the shape of a "hairpin", that is to say using a rod of elastically deformable metal, bent to form an open loop, the bent-over ends of this rod not being coaxial, is known. The pawl pivots on the body about these ends, so that the rod is deformed at the time of this pivoting and so that the pawl is brought back, by elastic return, into the position in which the snap hook is closed.

These conventional snap hooks have the drawback that they can be opened accidentally, and this prevents them from being used when safety is at issue, such as in the case of securing a harness.

In order to overcome this drawback, it is known for the snap hook to be equipped with safety means which keep the snap hook closed in any event.

A snap hook of this kind comprises a cylindrical sleeve that can slide over the free end of the pawl and over the corresponding branch of the body of the snap hook so as to occupy either an active position in which the sleeve extends both over this free end and over this branch, and prevents any movement of the pawl, or a retracted position, in which the sleeve is pulled back to extend only over the pawl and allows the latter to pivot. The sleeve is normally kept in the active position by a coil spring engaged over the pawl, and can be immobilized by screwing it onto the end of the branch of the body.

Other safety snap hooks comprise a retractable rod forming a brace which keeps the pawl in the closed position.

Existing safety snap hooks have the drawback of not being very easy to manipulate because they involve the use of both hands, one retracting the aforementioned sleeve or the aforementioned retractable rod, and the other pressing down on the pawl in order to pivot it.

The snap hook is difficult to hook on, given that both of the user's hands end up covering the opening of the snap hook. Under certain conditions, particularly in rough seas, the user finds himself temporarily unable to hold on to the boat, which may be particularly hazardous.

Existing safety snap hooks also have the drawback of consisting of a relatively large number of parts, and this leads to a high cost of manufacture and increases the risk of seizure in a marine environment.

The present invention aims to overcome all of these drawbacks by providing a safety snap hook that is easy to manipulate under all conditions, but which at the same time remains simple and relatively inexpensive to manufacture.

This snap hook comprises, in a way known per se, a body in the overall shape of a hook and a "hairpin" pawl.

According to the invention:

the pawl is shaped in such a way that its bent-over ends are normally kept in a spaced-apart position in which they are situated some distance from one another preventing any possibility of pivoting with respect to the body, and this pawl may be deformed in such a way as to bring the said bent-over ends into a position in which they are closer together, in order to make this pivoting possible, and the body of the snap hook comprises an aperture in which one of the said bent-over ends is engaged and can slide, while the other bent-over end is mounted so that it can pivot on the body about a fixed axis, this aperture being shaped to allow the bent-over end engaged in it to slide between the position in which the two bent-over ends of the pawl are spaced apart and the position in which these ends are closer together.

Thus, the pawl cannot be pivoted into the position in which the snap hook is open unless it has been deformed beforehand to bring its two bent-over ends closer together. Two different actions are therefore needed in order to open this snap hook, and this allows it to be used as a safety snap hook.

This snap hook at minimum consists of merely two parts, and remains simple and relatively inexpensive to manufacture.

As a preference, the pawl is not in its neutral shape when it is mounted on the body and when its bent-over ends are distant from one another, but is shaped in such a way as to be pre-stressed in the direction of bringing these ends closer together. The return of form due to this pre-stress ensures that the bent-over ends are kept some distance apart, and the force needed to bring these ends closer together is higher, thus further reducing the risk of inadvertent opening.

As a preference, the snap hook comprises means which bear against the pawl in order to deform it.

These means may simply consist of a finger/thumb tab fixed to the pawl, of a rider that can be moved by sliding, or of any other appropriate means. According to a preferred embodiment of the invention, these means consist of a lever mounted so that it can pivot on the body of the snap hook, allowing the pawl to be deformed easily.

Advantageously, the body of the snap hook comprises an eye at its end which accommodates the base of the pawl, and the lever comprises a tubular wall which bears and slides against the body in the region of this eye. This tubular wall constitutes the axis of pivoting of the lever and may have the rope to which the snap hook is connected passing through it. The lever is thus easy to mount on the body.

The lever may be made as a single piece clipped or riveted to the body, or may be made as two pieces sandwiching this body, and connected by any appropriate means such as bonding, clipping or riveting.

Advantageously, the lever extends over most of the opposite side of the body to the pawl, on the outside of this body.

Thus the snap hook can be opened with just one hand, in a natural and instinctive movement, the pivoting of the lever in the direction for bringing the bent-over ends of the pawl closer together being achieved by action of the fingers other than the thumb on this lever, while the pivoting of the pawl into the position in which the snap hook is open is achieved by action of the thumb on the pawl.

Accidental exertion of both these forces, which are in opposite directions, on the two members at the same time is practically impossible, which means that the snap hook guarantees perfect safety.

As a preference, the lever has a U-shaped cross-section and wraps around the side of the body along which it extends, which gives the snap hook a homogeneous structure, without sharp edges.

To make it easier to understand, the invention is described again hereinbelow with reference to the appended diagrammatic drawing which, by way of non-limiting example, depicts one preferred embodiment of the snap hook to which it relates.

FIGS. 4 and 5 are side elevations thereof, similar to FIG. 2, respectively in the process of opening, and in the fully opened position.

FIGS. 1 to 3 depict, from various angles, a safety snap hook 2, especially one that can be used in the field of sailing.

Figure 1:
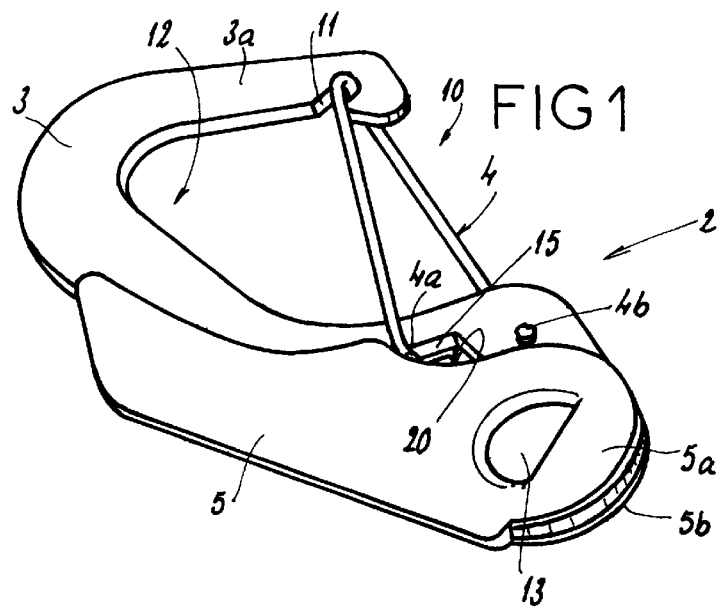
FIG. 1 is a perspective view thereof, when it is closed.

The snap hook 2 comprises a body 3, a pawl 4 and a lever 5.

The body 3 has the overall shape of a hook and defines a lateral opening 10 closed by the pawl 4, a bent-over branch 3a comprising a notch 11 in which the free end of the pawl 4 can engage, and a recess 12 accommodating the securing element (not depicted), such as a rope.

At its opposite end to the branch 3a, the body 3 has an eye 13, allowing the engagement of a securing rope to which the snap hook 2 is connected.

Furthermore, the body 3 comprises a chevron-shaped aperture 15, the shape and function of which will be explained later, as well as an aperture 16 in the shape of a slight arc of a circle centred on the axis of the eye 13.

The pawl 4 is "hairpin" shaped, that is to say it consists of a rod of elastically deformable metal, bent to form an open loop. One, 4a, of the bent-over ends of the rod is engaged and can slide in the aperture 15 while the other bent-over end 4b is engaged and can pivot about a fixed axis in a bore formed in the body 3.

Figure 2:
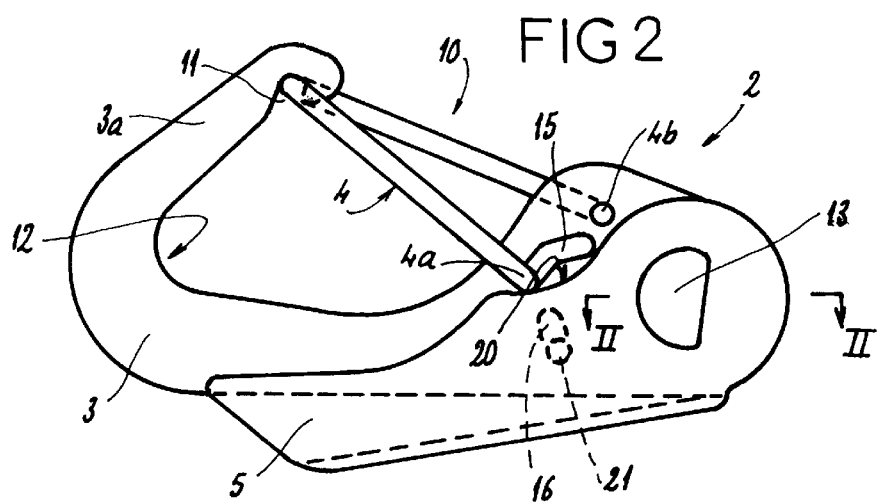
FIG. 2 is a side elevation view thereof.
Figure 3:
FIG. 3 is a view thereof from above, sectioned on the line III—III of FIG. 2.
Figure 3:
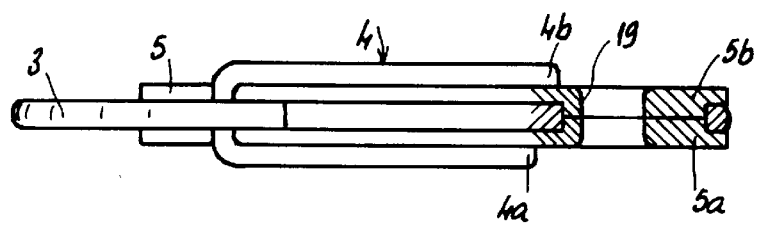

In its position depicted in FIGS. 1 to 3, the pawl 4 is slightly pre-stressed in the direction of bringing the bent-over ends 4a, 4b closer together.

Referring to FIG. 2, it is clear that that portion of the aperture 15 in which the end 4a is located is directed more or less at right angles to that lateral branch of the pawl 4 which is connected to this same end 4a. The other portion of the aperture 15 makes an angle of about 145° with this first portion, and is directed towards that end of the body 3 which has the eye 13.

The lever 5 has a U-shaped cross-section and wraps around most of the opposite side of the body 3 to the pawl 4 and around the portion of this body 3 that delimits the eye 13.

As FIG. 3 shows, the lever 5 consists of two pieces 5a, 5b sandwiching the body 3. Each of these pieces 5a, 5b has a tubular wall of circular exterior shape, shaped to be engaged in the eye 13 of the body 3, and to bear and slide against the body 3 in the region of this eye 13. These walls constitute the pivot 19 of the lever 5 with respect to the body 3 and may have the rope (not depicted) to which the snap hook 2 is connected passing through them.

Once in place, the two pieces 5a, 5b are joined together by any appropriate means such as bonding, clipping or riveting.

The piece 5a which lies on the same side as the bent-over end 4a comprises, near the aperture 15, a concave profile 20 along which this end 4a can slide when the lever 5 is pivoted.

Furthermore, one of the pieces 5a, 5b has a stud 21 engaged and able to slide in the aperture 16.

In practice, because of the aforementioned pre-stress on the pawl 4, the bent-over end 4a is normally kept in that portion of the aperture 15 which is furthest from the bent-over end 4b, as shown in FIGS. 1 to 3. The angle then formed between the lateral branches of the pawl 4 is such that the bent-over ends 4a, 4b are situated at a distance apart that prevents any pivoting of the pawl 4 with respect to the body 3.

The aperture 16 and the stud 21 are positioned in such a way that the lever 5 is placed in contact with this bent-over end 4a, and so that it is kept with respect to this end in the position depicted in these figures, namely of pivoting out from the body 3.

The user, when he wishes to open the snap hook 2, applies pressure more or less simultaneously to the lever 5, using his fingers other than his thumb, and to the pawl 4, using his thumb.

As the pawl 4 is immobile, this pressure causes a pivoting of the lever 5 towards the body 3, as shown in FIG. 4. The effect of this pivoting is gradually to displace the end 4a into that portion of the aperture 15 that is directed at right angles to the lateral branch of the pawl 4, as far as the mid-point of this aperture 15.

The bent-over ends 4a, 4b are then close enough together to allow the pawl 4 to start to pivot. This pivoting causes the end 4a to engage in the other portion of the aperture 15, the direction of which allows the end 4a to move back and the ends 4a and 4b to move still closer together. This movement backwards and closer together allows the pawl 4 to continue to move as far as the fully pivoted position shown in FIG. 5.

The deformation of the pawl 4 due to the ends 4a and 4b being brought closer together allows the pawl 4 to return instantly to the position in which the snap hook is closed as soon as the pressure exerted on the pawl is released.

The invention thus provides a safety snap hook 2 which has the numerous advantages mentioned earlier, particularly those of being easy to manipulate under all circumstances, and of remaining simple and relatively inexpensive to manufacture.

It goes without saying that the invention is not restricted to the embodiment described hereinabove by way of example but that, on the contrary, it encompasses all alternative embodiments thereof. Thus, the aperture 15 may have a shape other than that depicted in the drawing, the essential feature being that this aperture should comprise a wall against which the end 4a rests which, when the pawl 4 is in the undeformed state, prevents any pivoting of this pawl, and a length such that it allows the ends 4a, 4b to be brought close enough together to make this pivoting possible.

Furthermore, the aperture 16 and the stud 21 may respectively be replaced by an aperture in the shape of a sector of a circle, formed in the wall of the body 3 delimiting the eye 13 and centred on the axis of this eye, and by a lug projecting radially from the tubular wall forming the pivot 19, outwards therefrom, and engaged in the said circular-sector-shaped aperture.

I claim:

1. A safety snap hook, comprising:
   a body; and
   a pawl including a rod of elastically deformable material, bent to form an open loop, and bent-over ends about which the pawl pivots with respect to the body, the bent-over ends not being coaxial;
   the pawl being shaped such that the bent-over ends are normally kept in a spaced-apart position in which they are situated some distance from one another preventing pivoting with respect to the body, and the pawl being deformable in such a way as to bring the bent-over ends into a position in which they are closer together, in order to make pivoting possible;

the body further defines an aperture in which one of the bent-over ends is engaged and can slide, while the other bent-over end is mounted so that it can pivot on the body about a fixed axis, this the aperture being shaped to allow the bent-over end engaged in it to slide between the position in which the two bent-over ends of the pawl are spaced apart and the position in which these ends are closer together.

2. Snap hook according to claim 1, wherein the pawl is shaped in such a way as to be pre-stressed in the direction of bringing the ends closer together when it is mounted on the body and when these bent-over ends are spaced apart.

3. Snap hook according to claim 1, further including means which bear against the pawl in order to deform it.

4. Snap hook according to claim 3, wherein the means includes a lever mounted so that it can pivot on the body.

5. Snap hook according to claim 4, wherein the body comprises an eye at its end which accommodates the base of the pawl, and the lever comprises a tubular wall which bears and slides against the body in the region of this eye.

6. Snap hook according to claim 4, wherein the lever extends over most of the side of the body opposite to the pawl, on the outside of this body.

7. Snap hook according to claim 4, wherein the lever has a U-shaped cross-section and wraps around the side of the body along which it extends.

8. Snap hook according to claim 1, wherein the aperture is chevron-shaped, that portion of this aperture in which the end is normally located being directed more or less at right angles to that lateral branch of the pawl which is connected to this same end, and the other portion of this aperture making an angle of about 145° with this first portion of the aperture.

9. Snap hook according to claim 5, wherein the body comprises an aperture in the shape of a slight arc of a circle centred on the axis of the eye, and the lever comprises a stud engaged and able to slide in this aperture.

* * * * *